United States Patent [19]

Weihe, Jr.

[11] 4,410,081
[45] Oct. 18, 1983

[54] CONVEYOR SYSTEM

[76] Inventor: Clyde R. Weihe, Jr., 17 Lindberg Ave., Needham Heights, Mass. 02194

[21] Appl. No.: 314,770

[22] Filed: Oct. 26, 1981

[51] Int. Cl.³ .............................................. B65G 35/00
[52] U.S. Cl. .................................. 198/725; 198/845; 134/70
[58] Field of Search ............... 198/472, 725, 838, 845, 198/851, 853; 104/172 C, 172 R; 134/70, 134

[56] References Cited

U.S. PATENT DOCUMENTS

| 2,150,320 | 3/1939 | Edwards | 198/838 |
| 2,648,580 | 6/1953 | DeBurgh | 104/172 B X |
| 3,117,668 | 1/1964 | Weihe, Jr. et al. | 198/648 |
| 3,718,249 | 2/1973 | Hess | 198/838 X |
| 3,777,877 | 12/1973 | Piper | 198/838 X |

FOREIGN PATENT DOCUMENTS

| 731742 | 6/1955 | United Kingdom | 198/845 |
| 783200 | 9/1957 | United Kingdom | 198/838 |

Primary Examiner—Jeffrey V. Nase
Assistant Examiner—Paul A. Sobel
Attorney, Agent, or Firm—Herbert L. Gatewood

[57] ABSTRACT

A conveyor system is provided which includes a conveyor table which has an advancing section wherein a conveyor transports racks of small objects from a loading position to a position wherein the racks can be removed from the conveyor or unloaded, and a return section wherein the conveyor returns unloaded racks positioned on their sides to the loading point where the racks can be again loaded with small objects or removed from the conveyor for storage, or until later needed. The conveyor is an endless length of a plurality of links joined together head-to-toe, next adjacent links being connected together in such a manner as to allow horizontal pivotal motion permitting the conveyor to move in a curved direction. Each link provides support for the racks and is in turn supported on a rotatable member which makes only line contact with the conveyor table as the conveyor is moved along the conveyor table.

22 Claims, 9 Drawing Figures

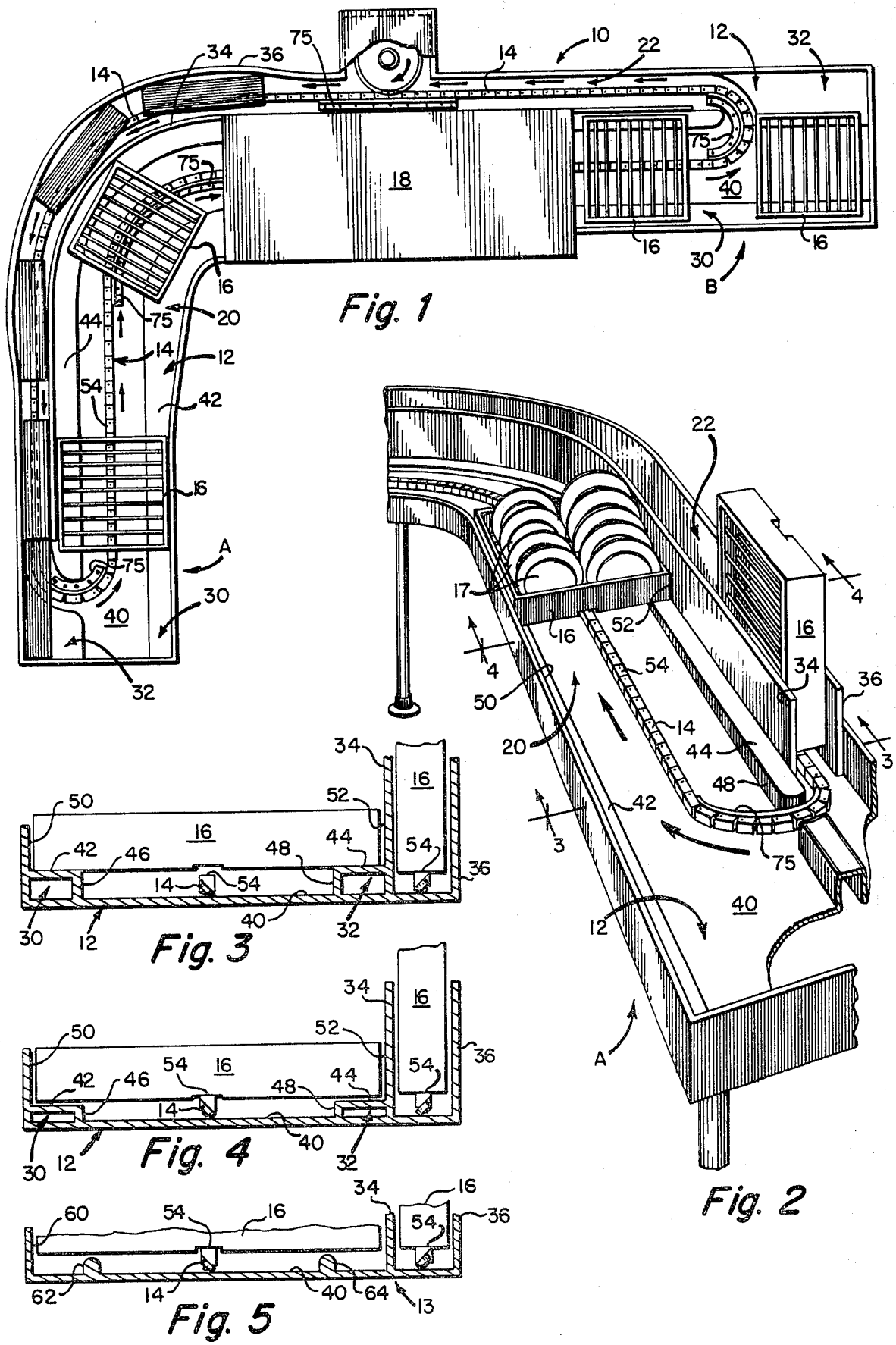

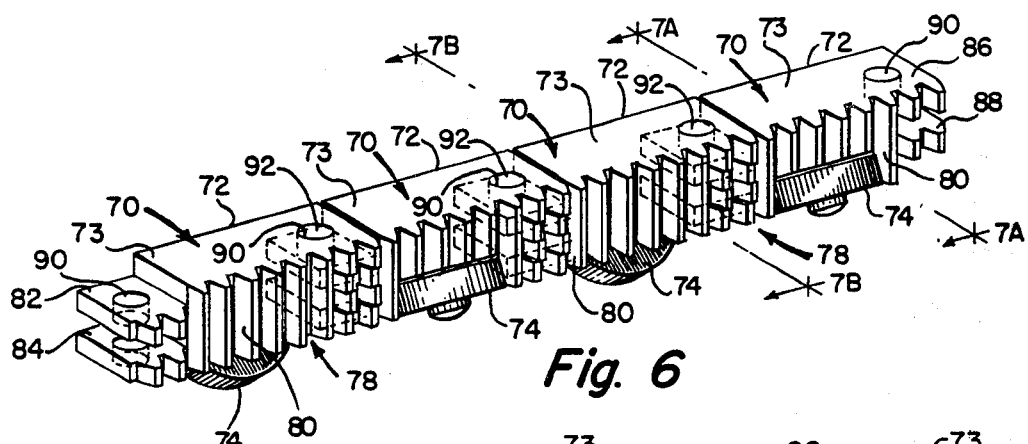
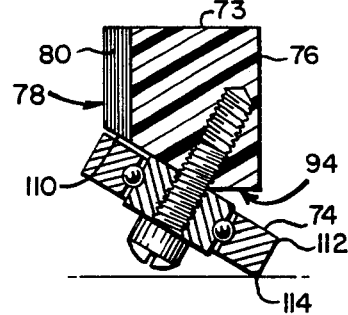 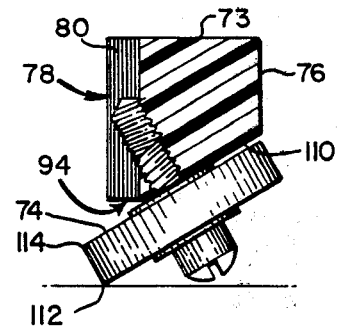
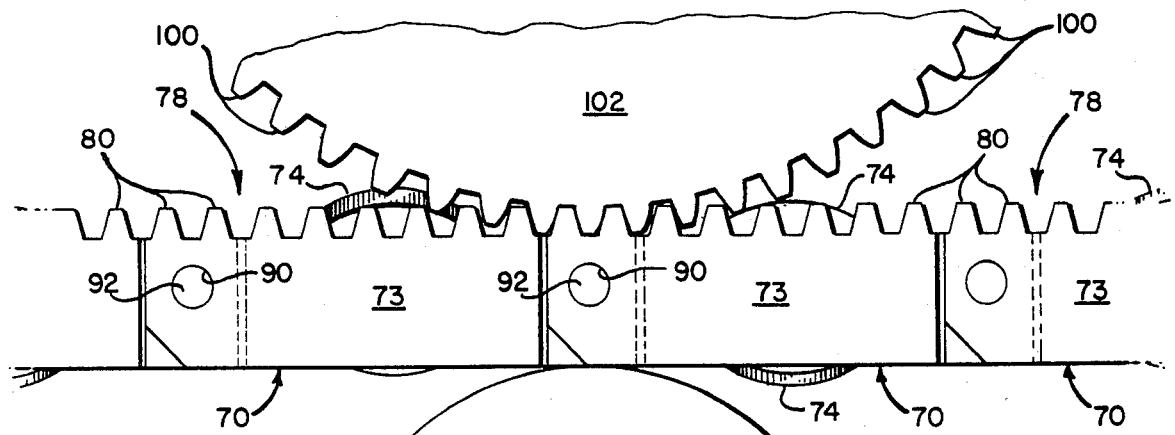
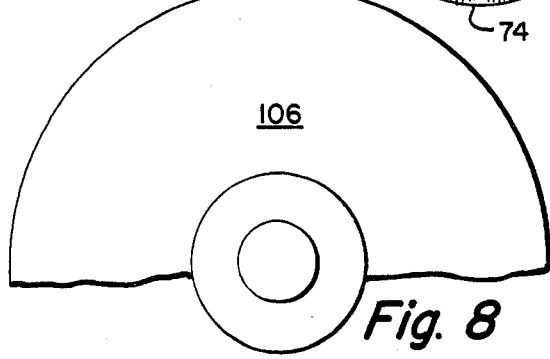

CONVEYOR SYSTEM

BACKGROUND OF THE INVENTION

(1) Field of the Invention

This invention in general relates to a conveyor system for transporting objects from one station to another and, in particular, to the conveyor used in that system.

(2) Description of the Prior Art

Over the years numerous and various systems have been devised to transport or convey various objects of different sizes and shapes from one station to another. Those various conveying systems of which I am aware have been used in a wide variety of applications, for example, in commercial dishwashing operations, in cafeteria returns to transport trays of soiled dinner and tableware from the eating area to the kitchen, in ice cream factories to transport cartons of ice cream mix through the freezing zone, in hospitals where patients' food trays are made up, and in various work in process situations, i.e., assembly line operations.

One conveying system used in a commercial dishwashing operation and which was devised by the present inventor, along with Edward C. Grotto, is shown in U.S. Pat. No. 3,117,668, which issued Jan. 14, 1964. As disclosed in that patent, the conveyor is associated with a dishwashing machine in such fashion as to move racks of dishes through the washing machine from its entrance to its exit. The racks are supported on rectangular shaped dollies which in turn are supported by roller assemblies. These rollers ride in tracks located in a conveyor table providing a support for the system as well as a predetermined direction of travel.

Although the above conveyor system has been found quite satisfactory in many dishwashing operations, and it offers the advantage of better labor utilization in that it provides a means for returning empty racks, it is nevertheless attendant with certain disadvantages. In particular, this system does not allow cleaned racks of dishes to accumulate, once the racks exit from the dishwashing machines. The dollies on which the racks sit while being conveyed, are a fixed part of the conveyor. Thus, if the racks of clean dishes are not removed, they are returned by the conveyor to the point at which soiled dishes are loaded on to the conveyor. As a result, when the dishwashing machine is in operation, personnel must always be located at the discharge end to remove the rack of clean dishes.

A further disadvantage with the conveyor system disclosed in U.S. Pat. No. 3,117,668 is that, because it provides a return for empty racks, the lay-out of the system, e.g. oval shape in plan, necessarily involves lost space. The dollies require, for any particular installation, a certain minimum turning radius to maneuver the horizontally disposed track. Accordingly, the space requirements of this system are somewhat limiting in its use.

Another conveyor system developed by the present inventor, and which has been quite satisfactory in some dishwashing operations, is disclosed in U.S. Pat. No. 3,237,755, which issued Mar. 1, 1966. That conveyor system basically comprises an endless driven chain which comprises a plurality of links joined together. A set of main rollers project below the chain and roll along a table. The links have an upper extension on which a set of auxiliary rollers are mounted. The trays of dishes or other articles carried on the conveyor rest on the auxiliary rollers and are ordinarily carried along by the forward movement of the chain. If movement of the trays is in some way obstructed, however, the trays though stationary will roll on the auxiliary rollers so that the conveyor chain continues to move freely.

Although the system disclosed in U.S. Pat. No. 3,237,755 allows for accumulation of trays of dishes, etc., making unnecessary the immediate removal thereof, and allowing personnel to be absent from the discharge point momentarily, it does not provide for return of empty trays or racks to a loading point. This can only be accomplished by location of a similar system next to it, and positioned to operate in the reverse direction. Otherwise, empty racks must be manually returned to the loading station.

In the above, and other conveyor systems of which I am aware, particularly in food-service operations, not only is there a rather large initial cost involved in the installation, the cost of operating these conveyor systems is appreciable, as is the cost in their continual maintenance. In some installations, the drive mechanisms for the particular conveyor involved are necessarily rather large, and with todays ever increasing cost for electricity, this has become of some concern. Moreover, as these systems are made up of various mechanical components, these components require periodic adjustment and takeup due to wear. Other components require replacement as they wear or are broken or damaged.

In food-service operations, in particular, the conveyor table and conveyor are often dirtied by food from soiled plates, and other dinner and tableware, requiring constant cleaning with water. However, even though in some cases cleaning water sprays are incorporated in the system, cleaning is less adequate than desired, leaving a somewhat unsanitary situation. Cleaning of the conveyor is complicated in many cases as the conveyor return is often located in a relatively inaccessible place. As the conveyors are metal, when washed with water, they must then be subsequently lubricated to prevent rust. The lubricant is sometimes incorporated directly into the water spray cleaning mechanism. Washing and lubrication both naturally increase the overall cost of maintaining the system. In some cases, food particles build up on the conveyor table, or in the conveyor track resulting in a rather hard packed deposit, necessitating shut-down of the system for cleaning and removal, to avoid possible damage to the conveyor system.

Of critical concern today also is the saving of energy, as these costs keep ever increasing. In a dishwashing system, racks of soiled dishes are conveyed through the dishwashing machine wherein the dishes are subjected to various wash and rinsing cycles. Such a system is disclosed in U.S. Pat. No. 3,363,636 which issued Jan. 16, 1968 to Clyde R. Weihe, Jr., the applicant herein. In some installations, once the conveyor system is placed in operation, the various wash/rinse cycles continue their operation whether or not soiled dishes are being conveyed through the dishwashing machine. As a result, these systems are attendant with considerable waste of water and energy. Thus, it is a desire that in any dishwashing system each cycle be individually controlled with on and off operation, using rinse water, detergent water, etc., only when racks of soiled dishes are being conveyed through the dishwashing machine.

SUMMARY OF THE INVENTION

The invention in its more basic aspects involves a conveyor for transporting racks of objects from one station to another and in its more preferred aspects to a continuous conveyor system having an advancing section wherein loaded racks are transported from a loading station to an unloading station, and a return section wherein unloaded, i.e. empty racks, are returned from the unloading station to the loading station.

The conveyor system, in general, comprises a conveyor table defining a continuous track for predetermined movement of the conveyor, the conveyor comprising a plurality of individual links which are connected together in head-to-toe fashion, each link comprising a body member for supporting the racks while being conveyed and rotatable means mounted on the body member for rotation in a plane making an acute angle with the direction of travel by means of which the links are supported on the conveyor table and the conveyor is moved along the conveyor table making only a rolling line contact, the next adjacent links being connected in such a manner as to permit each link to pivot in a horizontal plane whereby the conveyor can move in a horizontally curved fashion.

Quite advantageously, the conveyor system of the invention is relatively simple in design, involving few working parts. As a result, it is relatively easy to maintain and keep clean, providing a system that is not only relatively economical in operation but one that can be used in a wide variety of applications having somewhat limited space.

The system permits accumulation of loaded racks of objects, e.g. dishes at the discharge end of the dishwashing machine, without need for shutting down the conveyor. As a result, more efficient use can be made of personnel. Racks of clean dishes can be removed to a more distant point for unloading while other racks of soiled dishes are being conveyed through the dishwashing machine, being cleaned, and accumulated at the rack unloading, or removal station.

The simplicity of the conveyor construction allows lighter drive motors to be used and more sensitive clutches which can better provide for overload conditions. Thus, the system provides not only more economical, but also relatively trouble-free, operation, and safe conditions in the working area.

BRIEF DESCRIPTION OF THE DRAWING

The invention is described in greater detail hereinafter, reference being made to the drawing to facilitate understanding of the invention, in which:

FIG. 1 is a schematic plan view of one lay-out of a conveyor system in accordance with the invention, used in a dishwashing system application;

FIG. 2 is a view in perspective showing a lay-out differently from that shown in FIG. 1, the loading station being shown in the fore front of the drawing;

FIG. 3 is a view in cross-section of the conveyor table shown in FIG. 2 taken at secant lines 3—3;

FIG. 4 is a view in cross-section of the conveyor table shown in FIG. 2 taken at secant lines 4—4;

FIG. 5 is a view in cross-section of another conveyor table that can be used in the practice of the invention;

FIG. 6 is a perspective view of a section of the conveyor shown in FIG. 2;

FIG. 7A is a view in cross-section of one of the links of the conveyor shown in FIG. 6;

FIG. 7B is a partial view in cross-section of the next adjacent link, showing the reverse orientation of the rollers; and FIG. 8 is a plan view showing the means for driving the conveyor shown in FIG. 2.

DETAILED DESCRIPTION OF THE INVENTION AND THE PREFERRED EMBODIMENTS

Turning now to the drawing, there is shown in FIG. 1 thereof a schematic plan view of a dishwashing system 10 in which a conveyor system in accordance with the invention can be advantageously used. As shown in FIG. 1, dishwashing system 10 comprises a conveyor table 12 defining an endless track about which conveyor 14, as indicated by the direction of the arrows, travels, for moving racks 16 (FIG. 2) of dishes 17 through a conventional commercial dishwashing machine shown by dotted lines, and identified in FIG. 1 by reference numeral 18.

In operation, referring to FIG. 1, soiled dishes are loaded in the racks at Station A, and the loaded dishes are then conveyed forwardly through the dishwashing machine 18, the rack of cleaned dishes exiting from the dishwashing machine and conveyed to Station B where the racks can, if desired, be removed to a more remove location for removal of the dishes for storage and later use. As the racks of soiled dishes are advanced through advancing section 20 of the conveyor table 12, and cleaned, a rack can, if desired, be removed from the conveyor as soon as it emerges from the dishwashing machine 18. However, as will be more clearly set forth later, this need not be done. The racks can, quite advantageously, accumulate one after the other at unloading Station B (advancing section 20), allowing kitchen personnel to momentarily handle another chore without concern for the operation of the conveyor. Thus, for example, a rack of clean dishes can be removed from the conveyor and taken to the dining room, put away for later use, and the empty rack returned to station B for return by the conveyor, as hereinafter further disclosed, to loading Station A. At the same time that an empty rack 16 is placed on the return section 22 of the conveyor table 12, a rack of clean dishes can be removed, taken to the dining room, put away, etc.

Racks 16, as will be better appreciated in referring to FIG. 2 of the drawing, are returned by the conveyor 14 on their sides. Thus, return section 22 of the conveyor table, quite advantageously, need not be of the same width as advancing section 20 wherein the racks are supported on their bottom. The relative width of the return section to the advancing section will depend somewhat on the depth of the rack used, and the particular application for the conveyor system. However, as will be readily appreciated, in the case of a dishwashing system application (FIG. 2), the width of the return section can be less than half that of the advancing section. In any event, this feature of the invention permits installation of an endless conveyor system in locations not heretofore meeting the space requirements for such endless systems including a return section.

The racks 16 used in the practice of the invention are those conventionally used in dishwashing systems and are of open bottom construction to allow detergent water, etc. to drain out. However, in other applications, it may be desirable to employ more shallow racks, or racks that are somewhat deeper, or racks that are perhaps, open-topped, but of non-open construction. The term "racks" is used herein to include any tray, container, basket, receptacle, etc. for smaller objects and need not necessarily be of square or rectangular configuration.

It will be appreciated that to what extent racks of clean dishes can be allowed to accumulate depends to some extent on the length of the table at Station B (FIG. 1), as well as the speed of the conveyor. The longer the conveyor table at Station B, the more racks of clean dishes that can be allowed to accumulate. Nevertheless, as hereinafter more fully explained, racks of dishes can be allowed to accumulate somewhat at will without need for stopping the conveyor. This can be accomplished without concern for waste of detergent, rinse water, etc. in the dishwashing machine 18, as each cycle in the dishwashing machine is activated only by a rack of dishes entering that particular cycle and is deactivated on its going on to the next cycle.

The actual constructional configuration of conveyor table 12 will be better appreciated by reference to FIG. 2. In this figure, one is looking at the discharge end of return section 22 and the point at loading Station A where racks 16 of soiled dishes 17 are placed on conveyor 14 for movement through the dishwashing machine (not shown). The width of advancing section 20 and return section 22 of the conveyor table is determined by side walls 30, 32, and rack supports 34, 36, respectively, each of which extends vertically upwardly from horizontally disposed planar bottom 40, and along the entire length of the respective sections which they define. As will be seen more clearly in FIGS. 3, 4 side walls 30, 32 each comprises respectively, planar, horizontally disposed support portions 42, 44 connected at their respective inner ends to vertical support members 46, 48 which are, in turn, connected to the conveyor table bottom 40. The horizontally disposed support members are located in the same plane, parallel to bottom 40, and as hereinafter disclosed more fully help to balance and support racks 16 as they are being conveyed through the advancing section. Quite advantageously, however, the racks as later disclosed are supported primarily by conveyor 14 and are supported, if at all, by only one of support portions 42, 44 at a time, resulting in somewhat less drag or resistance to movement.

At the outer ends of the horizontal support portions are provided vertically disposed planar rack retaining walls 50, 52 which are located in planes parallel to one another. As will be appreciated, these retaining walls prevent the racks from moving unduly in a sidewise direction, maintaining the racks movement in a predetermined direction of travel from Station A, through the dishwashing machine, to unloading Station B. Nevertheless, it will be appreciated that retaining walls 50, 52 should be spaced a sufficient distance apart as to allow free movement forward.

Supports 34, 36 in the return section, contrariwise to the function of vertically disposed side walls 30, 32, provide no support to the bottom of the racks being conveyed. These supports merely help to balance the racks, and maintain them vertically oriented, the entire support of the racks being provided by conveyor 12. These uprights or supports, as shown, define parallel planes and are attached directly to bottom 40 by suitable screw fastening means, welding, or the like. As will be appreciated, these supports will extend vertically upwardly to a greater length than side walls 30, 32; however, this can vary somewhat as desired. The only requirement is that supports 34, 36 extend upwardly to a height sufficient to prevent the racks from toppling over while being conveyed back to their return location. These supports additionally should be spaced horizontally apart sufficient for the racks to be freely conveyed without hindrance through return section 22, but yet retained in substantially upright orientation.

Conveyor table 12 can, of course, be constructed of various materials; however, in the event the conveyor system is used in a kitchen it will be preferably constructed of corrosion-resistant stainless steel, as is conventionally done. The table and its various sections can obviously be made of various lengths as desired and can be fabricated from formed or rolled sections welded together to provide somewhat continuous surfaces through out. Conveyor table 12, as will be appreciated can be supported by vertically disposed legs (not shown); however, the manner of support may vary depending on the particular appliction in which the conveyor system is used. In case the conveyor system is used in a commercial dishwashing application, the table should be supported at a convenient height for the kitchen personnel to load and unload the racks of dishes.

Conveyor 14 is mounted in advancing section 20 and return section 22 so as to be located on the elongated, imaginary mid-line extending the length of the respective sections between the rack retaining portions 50, 52 and supports 34, 36. As will be appreciated, in referring to FIG. 2 of the drawing, the rack retaining portions 50, 52 are spaced apart from one another such that racks 16 can be, if desired, supported on support portions 42, 44. However, these retaining portions should be spaced apart no more than is necessary to allow free movement forward of the racks. In this way, no lost sideways motion occurs. And there is no possibility that the racks can become so disoriented with the direction of travel that their corners become wedged against the retaining walls, resulting in a blockage of movement.

It is not intended that the bottom of the racks 16 actually ride, certainly not simultaneously, on the horizontally disposed support surfaces 42, 44. The racks are supported on, and are moved along the table 12 by conveyor 14. Thus, these support surfaces help maintain the racks in essentially a horizontally disposed plane, if unbalanced. The location of the support surfaces relative to bottom 40 should be such that this function is provided. However, it will be appreciated that the distance the two support surfaces are spaced vertically above bottom 40 can vary somewhat. Ideally these support surfaces will be so located relative to the top surface 54 of the conveyor 14 that little frictional resistance is offered by the support surfaces to the forward movement of the rack of dishes. Moreover, resistance to movement can be decreased even further by providing the support surfaces each with a narrow rib of inverted V-shaped, so that the unbalanced rack is supported merely by a line rather than a flat surface, as shown. The support surface can, if desired, be provided with a low friction coating, e.g. polyacetal resin, or some other polymeric material providing good frictional properties yet capable of withstanding hot water and detergent. Instead of the low friction coating, if desired, the support surfaces can, instead, be provided with a narrow-preformed strip or band of low friction material which extends the length of the conveyor table section. These preferred low frictional materials are well known and are believed to require no detailed discussion herein.

The strip can be attached by various means suitable for the application at hand, e.g. adhesive or mechanical fasteners. Instead, the preformed strips can be located in a channel provided according to usual techniques in the face of the supporting surfaces.

Although the racks used in the practice of the invention are those conventionally used for this purpose, racks which are manufactured of low friction materials, e.g., the polyacetal resins will be found most desirable. Racks of these materials can be readily manufactured by conventional molding techniques and will offer little drag when being balanced on one of the supporting surfaces while being conveyed. Instead of the polyacetal resins, racks can be provided of various other plastic materials, e.g. polyvinyl chloride, now used for such racks, the plastic compositions being compounded with various additives as desired, including low friction components, to achieve the desired properties.

The racks need not be provided entirely of low friction material. If desired, a narrow strip or band of such a material can be provided only along the bottom edges of the rack where contact might be made with a supporting surface.

Although not specifically shown in the drawing it will be appreciated that the conveyor table at Station A can be provided with an end extension or accompanying work area along the side so that the racks 16, as they are discharged from the return section 22, can be positioned bottom side down for loading of soiled dishes. This extension or work area need not necessarily be an integral part of the conveyor table, and can be free standing, if desired. Or it can be integral with the discharge end of another conveyor located close by, bringing soiled dishes from, e.g. the dining area in a cafeteria to the kitchen.

Where space is a problem, particularly, the conveyor table can be so constructed that the horizontal support surfaces 42, 44 at the loading station are in a plane above that of the top surface of conveyor 14, as is shown more clearly in FIG. 3 of the drawing. Thus, an empty rack can be located on these support surfaces, for loading with soiled dishes, dinner ware, etc., with the conveyor 14 passing freely underneath. When the rack is loaded, it need merely be advanced on the conveyor table a short distance, where the plane of the supporting surfaces drops below that of the top surface of the conveyor (FIG. 4). At that point the conveyor supports the loaded rack and continues its advancement through the dishwashing machine, etc. Between these two different elevations, the supporting surfaces can taper into one another, or be sharply divided as desired. However, it is more desirable that the elevation of the supporting surfaces at Station A, if higher than that further on in the advancing section, gradually taper toward the low-elevation. Similarly at the unloading section, the plane of the supporting surfaces can be somewhat higher at the end of the advancing section providing some resistance to advancement of the racks and permitting loaded racks to accumulate in serial fashion.

Although the dishwashing system 10 shown in the drawing is of an L-shape floor plan, it obviously is not so limited. The system can take other shapes, e.g. U-shaped. However, the lay-out of the system will depend on many factors including the size of the system desired, the size of the room in which the system is installed, its desired location in the room, other equipment in the area, etc.

In the most preferred embodiment of the invention, as shown in FIGS. 1 and 2, advancing section 20 and return section 22 are provided as an integral part of one table; however, it will be appreciated that these sections can, if desired, actually constitute two separated sections but, most desirably, in any event, sharing a common loading and unloading area, i.e., the bottom 40 in that area will bridge both sections. Even if two separated tables are provided, in most cases it will be desirable that they be located closely adjacent, perhaps even connected together, so as to provide essentially a conveyor table of unitary construction.

As an alternative, the conveyor table can be constructed as shown in FIG. 5. In that construction, the conveyor table 13, as with conveyor table 12, comprises an advancing section 20 and return section 22. These two sections are defined respectively by planar vertically disposed side wall 60, and planar vertically disposed supports 34, 36, all of which extend upwardly from and are perpendicular to horizontally disposed bottom 40 in parallel planes. Vertical support 34, as will be appreciated, is common to both sections, and with side wall 60 serves to retain rack 16 in a predetermined direction of travel. One each side of conveyor 14, and equidistantly therefrom are provided rods 62, 64 which serve to support rack 16, if unbalanced on conveyor 14. However, as will be appreciated, rack 16 will be primarily supported by conveyor 14 and supported, if at all, by only one of the rods. These rods can be provided of plastic material desirably having low friction properties, or can be of metal coated with such release material. If desired, bottom 40 need not be planar but can instead be formed with raised positions having a smooth curve with the bottom providing the same function as the rods 62, 65. Whether rods are separately fastened to a planar bottom, or the bottom is so formed, these supports for the unbalanced rack will extend the length of the conveyor table in the advancing section. As before disclosed, at the loading Station A, the supports can be slightly higher, if desired, to allow free movement of conveyor 12 under a rack while being loaded. The rods 62, 64 desirably will have a rounded top surface as shown in FIG. 5, as this will cause less drag on the rack's movement by conveyor 14.

Conveyor 14, as seen more clearly in FIG. 6, is made up of a plurality of individual links 70 connected together in head-to-toe manner, to provide the desired conveyor length. The links each comprises an elongated body member 72 on which is mounted a rotatable member 74 by means of which the body member is supported on conveyor table 12 and caused to move along, by gear drive means, as hereinafter more fully disclosed. As will be seen more clearly by reference to FIG. 7, body member 72 is defined by horizontally disposed planar top surface 73 which supports racks 16 while being conveyed, and vertically disposed side walls 76, 78, perpendicular to top surface 73, side wall 76 being of planar configuration and parallel to the plane defined by side wall 78 which is provided with a plurality of vertically disposed teeth 80, the purpose for which if not already obvious will shortly be fully made clear. The body members are provided at each end with planar, horizontally extending portions 82, 84 and 86, 88 which, as shown, function as flanges by means of which the links can be connected together. The flanges are so located at the respective ends as to permit connection in tongue and groove fashion providing, as shown in FIG. 8, essentially a continuous supporting surface for the racks. The flanges at each end are each provided with circular shaped openings as indicated by reference number 90, these being concentrically and centrally located on the respective flanges, and the vertical center line connecting the two openings being located on the longitudinal center line of the body member 72. The connection between adjacent links is secured by pins 92, which extend through the openings in the flanges at each end, these pins being flush with the top surface 73 and planar, horizontally disposed bottom surface 94 defined by the body member. As will be appreciated, next adjacent links can pivot relative to one another about pin 92 in a horizontal manner, whereby the conveyor can move in a horizontally curved manner, as desired. The stability of the conveyor, as it moves, particularly around a curve, is enhanced by the inter-connecting flanges, the mating surfaces of which provide a conveyor of essentially unitary horizontal construction.

The direction of movement of the conveyor is determined by conveyor guides 75, spaced at appropriate points along the conveyor table, on opposite sides of the conveyor, as is shown in FIG. 2. These guides are manufactured of plastic material, preferably having low friction properties. The guides in the straight section of the table will be linear; however, those in the curved sections will be curved to the extent desired. The guides can be of any length. As shown in FIG. 2, a plurality of shorter length guides can be used along a curve of larger radius, while one guide of larger dimension can be used for sharper curves. Guides such as these are commonly used and form no part of the invention in and of themselves. As will be appreciated, other guides can also be used. It may be desirable in some instances to use rollers, rather than stationary guides. Whatever the guides used, their top surface should not touch the bottom of the racks being conveyed.

The length of the individual links as will be appreciated, can vary somewhat, as can their height. In general, the shorter the length, the better will the conveyor be able to manipulate a curve, particularly where the curve need be somewhat sharp because of space limitations. And somewhat greater stability will be offered to the conveyor where the plane of the top supporting surface is closer to the plane of the conveyor table than farther away. However, this will depend somewhat not only on the width of the conveyor link but also its length and the relative location of the rotatable means on the body member. In practice, I have found a cubic shaped body member, including the end flanges, measuring $2\frac{1}{2}'' \times 1'' \times 1''$, to provide quite satisfactory operation. The flanges in this case each measured 15/64" which will be appreciated can be cut off at the ends thereof or rounded, as desired, to permit a smaller turning radius.

As shown in FIG. 8, teeth 80 on links 76 mesh with teeth 100 provided on gear wheel 102, this wheel being supported on connecting rod 104 which in turn is connected in usual fashion to a drive motor (not shown). Gear wheels with various size teeth may be used in the practice of the invention, so long as the teeth 100 mesh with teeth 80. In practice, the body members described above have been provided with 4 teeth/inch. Other gear-type drives can be used, if desired. Or the body members can be provided with gear teeth on both sides, in which case a gear wheel will be provided on both sides, the rotation of both of which will be synchronized according to usual techniques. Opposite the gear wheel 102 is provided a back-up roller 106, e.g. of rubber composition, according to usual fashion, this roller being adapted for free rotation and in contact with side walls of the conveyor links, as shown. Various motors can be provided, to provide rotation to gear wheel 102, however, a conventional $\frac{1}{4}$ hp electric motor will be found quite satisfactory in most installations. The motor selected should be connected with appropriate clutches which provide for overload situations, e.g. where racks of loaded dishes are being accumulated at the unloading station and the conveyor continues operation in sliding contact with the bottom of the racks. Care should be taken, however, in any event, against too great an overload, to prevent damage to the motor, or the conveyor system. Such safety devices are commonly used and need no explanation herein.

As will be appreciated by reference to FIG. 6, the rotatable means 74 are mounted on next adjacent links so as to rotate in planes which are reversely oriented with respect to one another. These planes of rotation intersect with one another and the planes make an acute angle with respect to bottom 40 of the conveyor table. The rotatable means used in the practice of the invention were $\frac{1}{4}''$ ball bearing stainless steel rollers having a diameter of $1\frac{1}{4}$ inches. These rollers were mounted for free rotation to the planar, slanted portion 110 provided in bottom surface 94 of the body members, in such a fashion that the rollers contact bottom 40 only by their inner or outer circular rims 112, 114. Thus, as the conveyor moves along only a rolling line contact is made by the conveyor with the conveyor table. As will be appreciated, the conveyor will roll along with little effort, as little frictional resistance is offered to its movement. Most importantly, however, the slanted mounting of the rotatable means permits the conveyor 14 to travel around a relatively sharp corner, i.e., a horizontally disposed curve of rather small radius. As will be appreciated, the plane of rotation can vary some; however, most desirably, it will make an angle with the direction of travel between 30°–45°, preferably about 45°, however, this depends somewhat on the particular rotatable means used. In general, the smaller the angle, the better the rotatable means will travel around a rather sharp horizontal curve, and the larger the angle, (within the above designated range) the more sharply the rolling line contact made. At an angle above 45°, the more difficult it becomes to maneuver a horizontal curve, due to the frictional resistance to turning, requiring an undesirably large turning radius.

As will be appreciated, rotatable means other than ball bearing wheels disclosed herein will be found satisfactory. The critical thing is that on rotation, the rotatable means rotate in the slanted plane disclosed and that they define essentially a line contact with the conveyor table. Thus, a wheel or roller, the circumference of which defines a circle will also be found satisfactory. Quite advantageously, such a rotating surface as provided on the rotatable means used in this invention provides not only little drag on the conveyor movement but a rather sharp knife which cuts through garbage deposited on the conveyor table.

Body member 72 can be provided of various material, e.g. stainless steel, or various plastic materials. Plastic will be desired in many instances as this will provide for greater economics in initial cost. The links can readily be provided by usual molding techniques from e.g., nylon compositions, including various fillers to obtain the desired physical properties. It may be desirable to provide links with somewhat wider top surfaces. Thus, the body member can be of square configuration, rather than rectangular as shown. In this case, it may be desirable to provide two rotatable means on each link, the rotatable means slanting in reverse directions inwardly just as in the case shown in FIG. 6 wherein the rollers are mounted in reverse directions on next adjacent links. As will be appreciated, the reverse mounting of the rotatable means provides stability to the conveyor, whether on the same body member or next adjacent ones.

The facility of the conveyor to slide or pass under the accumulated racks, if the racks are being supported by the conveyor, can be somewhat improved by providing the body members of the conveyor links with a non-planar top surface. Thus, body member 72 can be arched, front-to-back, providing more intermittent contact between the conveyor top surace and the rack bottoms, e.g., slatted or ribbed, supported by the conveyor, than is provided by the somewhat continuous top surface shown in FIG. 8 of the drawing. In this case, the body members can be connected in head-to-toe fashion together by singular flanges extending from each end thereof, or two flanges can be provided on one end of the body member and only one on the other so that connection can be made in tongue and groove fashion.

In passing through the dishwashing machine, the conveyor table bottom can be provided with apertures to allow the dish water, etc. to drain through to a reservoir below. Or the conveyor table at that point can be reticulated, or of skeletal construction providing for drainage and more efficient dishwashing, rinsing, etc., as is commonly done in present systems. Thus, where this is done the conveyor will be supported in the dishwasher by a centrally disposed supporting track or strip. Although the conveyor is disclosed to be supported by and travels along a planar conveyor bottom, the track for the conveyor can be, a channel recessed in the bottom. However, this is somewhat less desirable in food operations because of the cleaning problem it presents.

The advancing section can, if desired, be provided at its end, i.e., at the unloading station, with vertically disposed strips rather than providing elevated horizontal rack supports, for accumulating racks of cleaned dishes, etc. Thus, these strips can be merely planar members vertically disposed, i.e. perpendicular to the horizontal rack supports, and located lateral to the direction of travel. The strips which will engage the front side of the racks at the edges can be fixedly secured or can be hinged to drop down in a recess or opening in the supports when their use is not desired.

As many different embodiments of this invention will now occur to those skilled in the art, it is to be understood that the specific embodiments of the invention as presented herein are intended by way of illustration only and are not limiting on the invention but that the limitations thereon can be determined only from the appended claims.

What I claim is:

1. A conveyor for transporting racks of objects from one station to another comprising a horizontal surface supporting a rotatable means, a plurality of links connected together in head-to-toe fashion, each link comprising a body member for supporting the racks and said rotatable means mounted thereon defining a plane of rotation making an acute angle with the horizontal surface upon which the conveyor is supported by means of which the conveyor is caused to move along a predetermined path, the next adjacent links being joined together in such a manner as to permit each link to pivot in a horizontal plane whereby said conveyor can move in horizontally curved fashion.

2. A conveyor system for transporting a rack for objects from one station to another comprising:
   (a) a conveyor table defining a track for predetermined movement of the rack, said table having an elongated, horizontally disposed bottom and vertically disposed spaced-apart side walls connected to the said bottom and extending along the tables length; and
   (b) a conveyor located midway between said side walls for supporting said rack while being transported between said stations, said conveyor comprising a plurality of individual links connected together in head-to-toe fashion, each said link comprising a body member for supporting the said rack and rotatable means mounted thereon defining a plane of rotation making an acute angle with the bottom of the conveyor table by means of which the conveyor is moved along said conveyor table, the next adjacent links being joined together in such a manner as to allow each link to pivot in a horizontal plane whereby said conveyor can move in a horizontally curved fashion.

3. A conveyor system for transporting a rack for objects from one station to another according to claim 2 wherein the said vertically disposed side walls each comprises a vertical support member connected to said bottom and a planar horizontally disposed support portion connected to the said vertical support member for supporting the said rack at an edge thereof, said support portions being in the same plane parallel to and located above said bottom but below the point at which the rack is supported by the said links.

4. A conveyor system for transporting a rack for objects from one station to another according to claim 3 wherein said side walls each further comprises a vertically disposed retaining member connected at the outer end of the planar support portion for retaining the rack in its predetermined track.

5. A conveyor system for transporting a rack for objects from one station to another according to claim 2 wherein the said vertically disposed side walls define an advancing section for transporting the rack while loaded with objects from one station to another and said table further comprises a return section defined by vertically disposed supports connected to said table and spaced apart equidistantly on each side of said conveyor whereby empty racks may be supported on their sides and returned to a desired position.

6. A conveyor system for transporting a rack for objects from one station to another according to claim 5 wherein the advancing section comprises a loading station and an unloading station, the vertically disposed spaced-apart side walls comprise planar horizontally disposed support portions for the rack bottoms, and these support portions, at least in a portion of the conveyor table, at the unloading station are in a plane higher than that of the rack supporting body members whereby the conveyor can pass freely underneath the rack bottoms.

7. A conveyor system for transporting a rack for objects from one station to another according to claim 3 wherein the planar horizontally disposed support portions comprise a raised rib running the length of the support surface whereby the rack bottom is supported by line contact offering little frictional resistance to movement of the rack.

8. A conveyor system for transporting a rack for objects from one station to another according to claim 3 wherein a low friction material is provided on the horizontally disposed support surfaces.

9. A conveyor system for transporting a rack for objects from one station to another according to claim 2 wherein the said rotatable means comprises a roller the circumference of which defines a circle whereby said rotatable means on rotation defines a line contact with the said bottom.

10. A conveyor system for transporting a rack for objects from one station to another according to claim 2 wherein the said rotatable means comprises a roller having a cylindrical shape defined by circular-shaped inner and outer rims, said roller being mounted on said body member in such a fashion as to rotate in a plane making an acute angle with the direction of travel of said conveyor whereby one of said rims of the said roller defines a line contact with the said bottom.

11. A conveyor system for transporting a rack for objects from one station to another according to claim 10 wherein the rotatable means on next adjacent links are mounted on the body member so as to rotate in planes which intersect with one another.

12. A conveyor system for transporting a rack for objects from one station to another according to claim 2 wherein said body member is of an elongated cubic-shape having a planar horizontally disposed top surface for supporting the said rack.

13. A conveyor system for transporting a rack for objects from one station to another according to claim 12 wherein spaced-apart horizontally disposed flanges extend from each end of the said body member, the flanges on the head and toe ends of each body member being so located as to permit connection of adjacent body members in tongue and groove fashion whereby to provide a relatively continuous surface for support of the said racks.

14. A conveyor system for transporting a rack for objects from one station to another according to claim 13 wherein holes are provided in vertical concentric alignment in said flanges at each end of the body member and a pivot pin is located at each end extending through the holes for connecting next adjacent links together.

15. A conveyor system for transporting a rack for objects from one station to another according to claim 12 wherein the system further includes drive means for the conveyor.

16. A conveyor system for transporting a rack for objects from one station to another according to claim 15 wherein the body member is provided with vertically disposed teeth on one side thereof and the drive means is a gear wheel having teeth which mesh with the vertically disposed teeth.

17. A conveyor for transporting racks for objects from one station to another according to claim 16 wherein the rotatable means comprises a roller having a cylindrical shape defined by circular-shaped inner and outer rims, said roller being so mounted on the body member as to travel on one of said rims when rotated thereby defining a line of travel.

18. A conveyor for transporting racks for objects from one station to another according to claim 16 wherein the rotatable means are mounted on next adjacent links in reversely oriented planes of rotation.

19. A conveyor for transporting racks for objects from one station to another according to claim 16 wherein the rotatable means comprises two rollers mounted on each body member directly opposed to one another in such a manner that the planes of rotation intersect with one another and each plane makes an acute angle with respect to the direction of travel.

20. A conveyor for transporting racks for objects from one station to another according to claim 16 wherein the body members are each of elongated cubic shape having a planar top surface 21. A conveyor for transporting racks for objects from one station to another according to claim 16 wherein the body member has an arcuate shape from front-to-back, providing intermittent spaced contact with and less drag with the rack bottom, whereby the conveyor can continue operation relative to a stationary rack.

22. A conveyor for transporting a rack for objects from one station to another according to claim 16 wherein said body member is plastic.

* * * * *